United States Patent
Park

(10) Patent No.: US 7,961,730 B2
(45) Date of Patent: Jun. 14, 2011

(54) PACKET FORWARDING SYSTEM HAVING AN EFFICIENT PACKET MANAGEMENT UNIT AND AN OPERATION METHOD THEREOF

(75) Inventor: Woo-jong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1359 days.

(21) Appl. No.: 10/777,150

(22) Filed: Feb. 13, 2004

(65) Prior Publication Data

US 2004/0215814 A1 Oct. 28, 2004

(30) Foreign Application Priority Data

Feb. 15, 2003 (KR) .................. 10-2003-0009601

(51) Int. Cl.
*H04L 12/56* (2006.01)
(52) U.S. Cl. ......... 370/392; 370/401; 370/412; 370/428
(58) Field of Classification Search .................. 370/389, 370/392, 401, 473, 474, 412, 428
See application file for complete search history.

(56) References Cited

U.S. PATENT DOCUMENTS

| | | | | | |
|---|---|---|---|---|---|
| 5,446,900 | A | * | 8/1995 | Kimelman | 717/124 |
| 6,046,999 | A | * | 4/2000 | Miki et al. | 370/395.52 |
| 6,381,242 | B1 | * | 4/2002 | Maher et al. | 370/394 |
| 6,539,460 | B2 | * | 3/2003 | Castelli et al. | 711/154 |
| 6,704,794 | B1 | * | 3/2004 | Kejriwal et al. | 709/236 |
| 6,977,930 | B1 | * | 12/2005 | Epps et al. | 370/392 |
| 7,085,850 | B2 | * | 8/2006 | Calvignac et al. | 709/246 |
| 7,167,927 | B2 | * | 1/2007 | Philbrick et al. | 709/250 |
| 7,307,988 | B1 | * | 12/2007 | Park | 370/389 |
| 7,415,020 | B2 | * | 8/2008 | Joung et al. | 370/392 |
| 7,523,179 | B1 | * | 4/2009 | Chu et al. | 709/222 |
| 7,562,133 | B2 | * | 7/2009 | Jain et al. | 709/223 |
| 7,627,693 | B2 | * | 12/2009 | Pandya | 709/250 |

(Continued)

FOREIGN PATENT DOCUMENTS

EP 1 217 800 A1 6/2002

OTHER PUBLICATIONS

Proknet : Not your average IP over ATM segmenter; Submitted in partial fulfillment of the requirements for 97.584: VLSI Design Professor Ralph Mason Fall Term 2000.*

(Continued)

*Primary Examiner* — Salman Ahmed
(74) *Attorney, Agent, or Firm* — Sughrue Mion, PLLC

(57) ABSTRACT

Disclosed is a packet forwarding system having an efficient packet memory management unit and an operation method therefor. The packet forwarding system includes an input unit inputting data in unit of transmission; a packet memory management unit assembling the data into an Internet Protocol (IP) packet and loading the packet into a packet memory, and reading out pointers of an IP packet header and an IP packet trailer connected to the header; a header processing unit deciding a packet classification and a transmission destination by using the read header, and re-transmitting to the packet memory management unit the pointer of the trailer connected to the header; and an output unit dividing the trailer read from the packet memory management unit into data in units of transmission based on the pointers of the header transmitted from the header processing unit and the trailer, and outputting the divided data to a channel.

8 Claims, 10 Drawing Sheets

U.S. PATENT DOCUMENTS

| | | | |
|---|---|---|---|
| 7,694,024 B2 * | 4/2010 | Philbrick et al. | 709/250 |
| 7,756,131 B2 * | 7/2010 | Lee et al. | 370/392 |
| 2002/0078196 A1 * | 6/2002 | Kim et al. | 709/224 |
| 2002/0095519 A1 * | 7/2002 | Philbrick et al. | 709/250 |
| 2002/0099907 A1 * | 7/2002 | Castelli et al. | 711/113 |
| 2002/0188742 A1 | 12/2002 | Nie | |
| 2004/0165613 A1 * | 8/2004 | Kim et al. | 370/463 |
| 2004/0184450 A1 * | 9/2004 | Omran | 370/372 |
| 2004/0215814 A1 * | 10/2004 | Park | 709/236 |
| 2006/0039374 A1 * | 2/2006 | Belz et al. | 370/389 |
| 2006/0133429 A1 * | 6/2006 | Seo et al. | 370/535 |
| 2006/0233156 A1 * | 10/2006 | Sugai et al. | 370/351 |
| 2007/0115939 A1 * | 5/2007 | Lee et al. | 370/352 |
| 2007/0118665 A1 * | 5/2007 | Philbrick et al. | 709/230 |
| 2007/0147257 A1 * | 6/2007 | Oskouy et al. | 370/238 |
| 2007/0186143 A1 * | 8/2007 | Gubbi et al. | 714/776 |
| 2008/0137601 A1 * | 6/2008 | Sung et al. | 370/329 |
| 2009/0154459 A1 * | 6/2009 | Husak et al. | 370/390 |

OTHER PUBLICATIONS

Gigabit Ethernet switches using a shared buffer architecture; Lau, M.V.; Shieh, S.; Pei-Feng Wang; Smith, B.; Lee, D.; Chao, J.; Shung, B.; Cheng-Chung Shih; Communications Magazine, IEEE vol. 41, Issue: 12 Digital Object Identifier: 10.1109/MCOM.2003.1252802 Publication Year: 2003.*

* cited by examiner

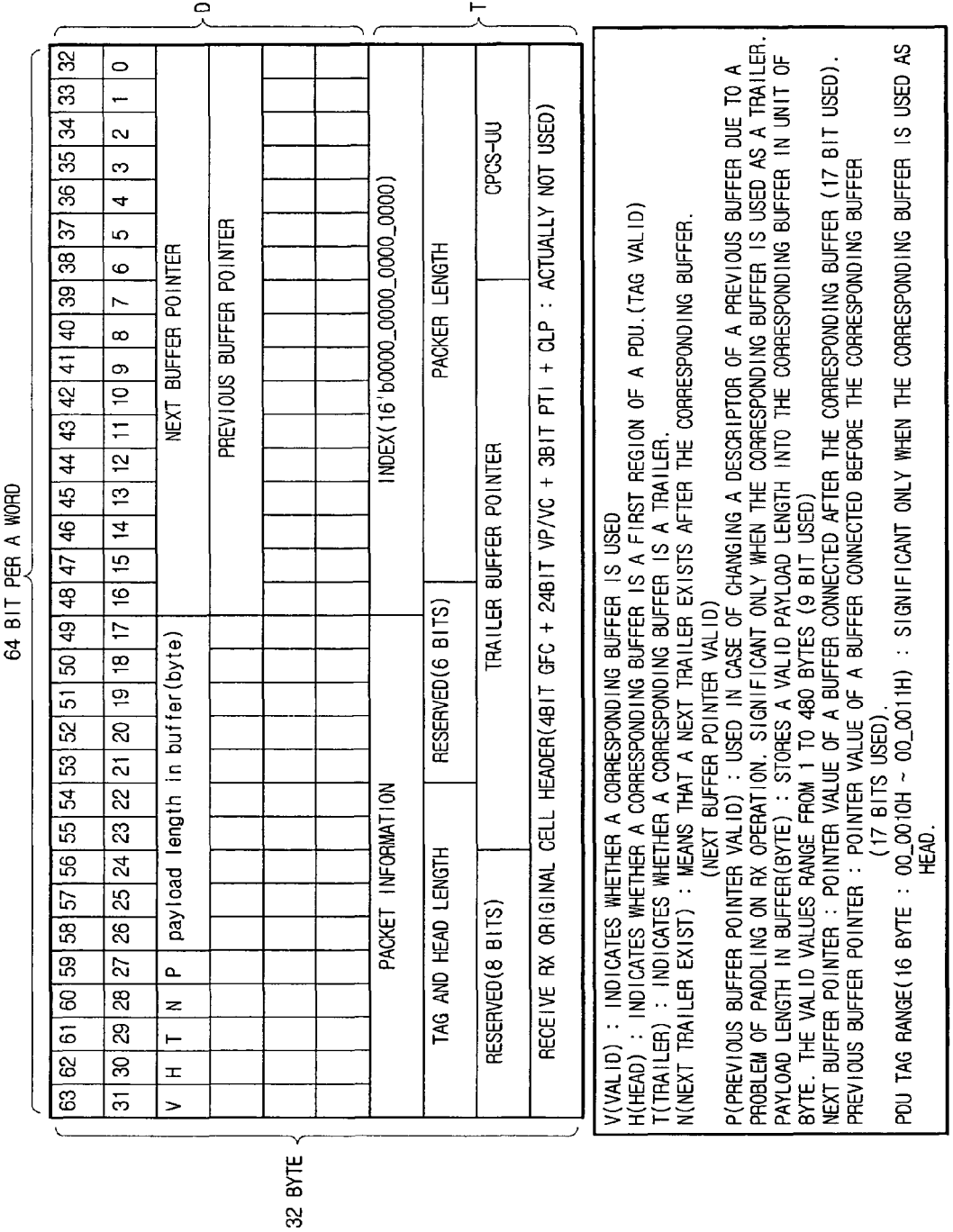

PACKET FORWARDING SYSTEM HAVING AN EFFICIENT PACKET MANAGEMENT UNIT AND AN OPERATION METHOD THEREOF

This application claims benefit under 35 U.S.C. §119 from Korean Patent Application No. 2003-9601, filed on Feb. 15, 2003, in the Korean Intellectual Property Office, the entire content of which is incorporated herein by reference.

BACKGROUND OF THE INVENTION

1. Field of the Invention

Apparatuses and methods consistent with the present invention relate to a packet forwarding system for forwarding packets to a destination at a high speed, and more particularly, to a packet forwarding system having an efficient packet memory management unit and an operation method thereof.

2. Description of the Prior Art

FIG. 1 is a block diagram for schematically showing a packet memory management unit of a conventional packet forwarding system.

The packet memory management unit has a packet generator 110, a controller 130, an empty queue 150, a transmit (TX) queue 170, and a packet memory 190.

The packet generator 110 creates Internet Protocol (IP) packets from data inputted in units of data transmission, units such as Asynchronous Transfer Mode (ATM) cells, and an IP packet contains at least one sub-packet each having a fixed length.

The controller 130 controls the empty queue 150 and the TX queue 170 to read and write (or load) sub-packets from and to the packet memory 190, and controls the overall packet memory 190 to deliver generated IP packets in a fixed transmission order.

The empty queue 150 has location information on empty spaces of the packet memory 190, that is, pointers of empty buffers, and the empty queue 150 operates in a stack basis, having information on a mutual connection from the header entry up to the trail entry.

The TX queue 170 records information on locations of IP packet header and trailer corresponding to IP packet transmission order, and operates in the first-in first-out (FIFO) basis.

FIG. 2 is a view for conceptually illustrating a conventional TX queue 170. The TX queue 170 needs spaces storing location information on the maximum number of N IP packet headers, and, further, needs spaces storing location information of a trailer of the largest IP packet. That is, the controller 130 transmits IP packet header and trailer stored or loaded in the packet memory 190 based on the location information of the IP packet header and trailer stored in the TX queue 170.

In general, SRAMs having excellent performance in random operations are used as a storage medium for the empty queue 150 and TX queue 170, and DRAMs having excellent performances in burst operations are used as a storage medium for the packet memory 190. That is, in view of the characteristics that IP packets are stored in the packet memory 190, the IP packet headers are randomly stored, but the trailer accompanying the IP packet header has information on mutual connections and stored in a burst manner.

Accordingly, there exists a problem in that the use efficiency of the conventional TX queue 170 is degraded depending upon the characteristics of storage media and the characteristics of data stored in the storage media.

Further, there is poor efficiency with respect to costs of using a large volume TX queue and an SRAM.

SUMMARY OF THE INVENTION

In order to solve the above problems, it is an aspect of the present invention to provide a packet forwarding system having a packet memory management unit and an operation method therefor, which enable efficient packet memory management by a trailer queue of an IP packet hidden in a packet memory.

In order to achieve the above aspect, a packet forwarding system, comprising having an efficient packet memory management unit according to the present invention comprises an input unit for inputting data in units of data transmission; a packet memory management unit for assembling the data into an Internet Protocol (IP) packet and loading the packet into a packet memory, and reading out pointers of an IP packet header and an IP packet trailer connected to the header; a header processing unit for deciding a packet classification and a transmission destination by using the read header, and re-transmitting to the packet memory management unit the pointer of the trailer connected to the header; and an output unit for dividing the trailer read from the packet memory management unit into data in units of data transmission based on the pointers of the header transmitted from the header processing unit and the trailer connected to the header, and outputting the divided data to a channel.

The packet memory management unit includes a packet generating unit for generating inputted data into the IP packet; a packet memory having plural buffers loading the IP packet, and the buffers storing buffer attribute information and a pointer of the trailer connected to the header; a transmission header queue for loading the header pointer corresponding to a transmission order of the IP packet; and a controller for reading the pointers of the header and the trailer connected to the header according to a transmission order determined by the transmission header queue, and transmitting the pointers to the header processing unit.

The controller, if the pointer of the trailer connected to the header is re-transmitted from the header processing unit, reads the trailer connected to the header from a buffer corresponding to the pointer of the trailer, and transmits the read trailer to the output unit.

Further, the controller verifies whether a different trailer connected to the trailer exists by using the buffer attribute information corresponding to the pointer of the trailer, and, if the different trailer exists, reading and transmitting the different trailer to the output unit.

The buffer attribute information includes pointers of buffers connected before and after the buffer, and information on whether the different trailer connected after the trailer exists.

In the meantime, a packet forwarding method according to the present invention comprises an input step of inputting data in units of data transmission; a packet memory management step of assembling the data into an Internet Protocol (IP) packet and loading the packet into a packet memory, and reading out from the packet memory and sending pointers of an IP packet header and an IP packet trailer connected to the header; a header processing step of deciding a packet classification and a transmission destination by using the read header, and re-transmitting to the packet memory management step the pointer of the trailer connected to the header; and an output step for dividing the trailer read from the packet memory management step into data in units data transmission based on the pointers of the header transmitted from the header processing step and the trailer connected to the header, and outputting the divided data to a channel.

The packet memory management step includes steps of assembling inputted data into the IP packet; loading the IP packet into plural buffers, and the buffers storing buffer attribute information and a pointer of the trailer connected to the header; reading from the pointers of the header and the trailer connected to the header according to a transmission order, and transmitting the pointers to the header processing step.

The packet memory management step further includes a step of, if the pointer of the trailer connected to the header is re-transmitted from the header processing step, reading the trailer connected to the header from a buffer corresponding to the pointer of the trailer, and transmitting the read trailer to the output step.

Further, the packet memory management step verifies whether a different trailer connected to the trailer exists by using the buffer attribute information corresponding to the pointer of the trailer, and, if the different trailer exists, reading and transmitting the different trailer to the output step.

Accordingly, the packet memory can be more efficiently managed by using storage media suitable for the operation characteristics of the header queue and trailer queue. Further, a solution can be provided to performance degradation due to time it takes to process headers in the packet forwarding system requiring a high-speed packet process.

BRIEF DESCRIPTION OF THE DRAWINGS

The invention will be described in detail with reference to the following drawings in which like reference numerals refer to like elements, and wherein:

FIG. 7b is a view for showing descriptor and tag formats stored in a buffer of FIG. 4;

DETAILED DESCRIPTION OF THE EXEMPLARY EMBODIMENTS

Hereinafter, the present invention will be described in detail with reference to the accompanying drawings.

Figure 1:
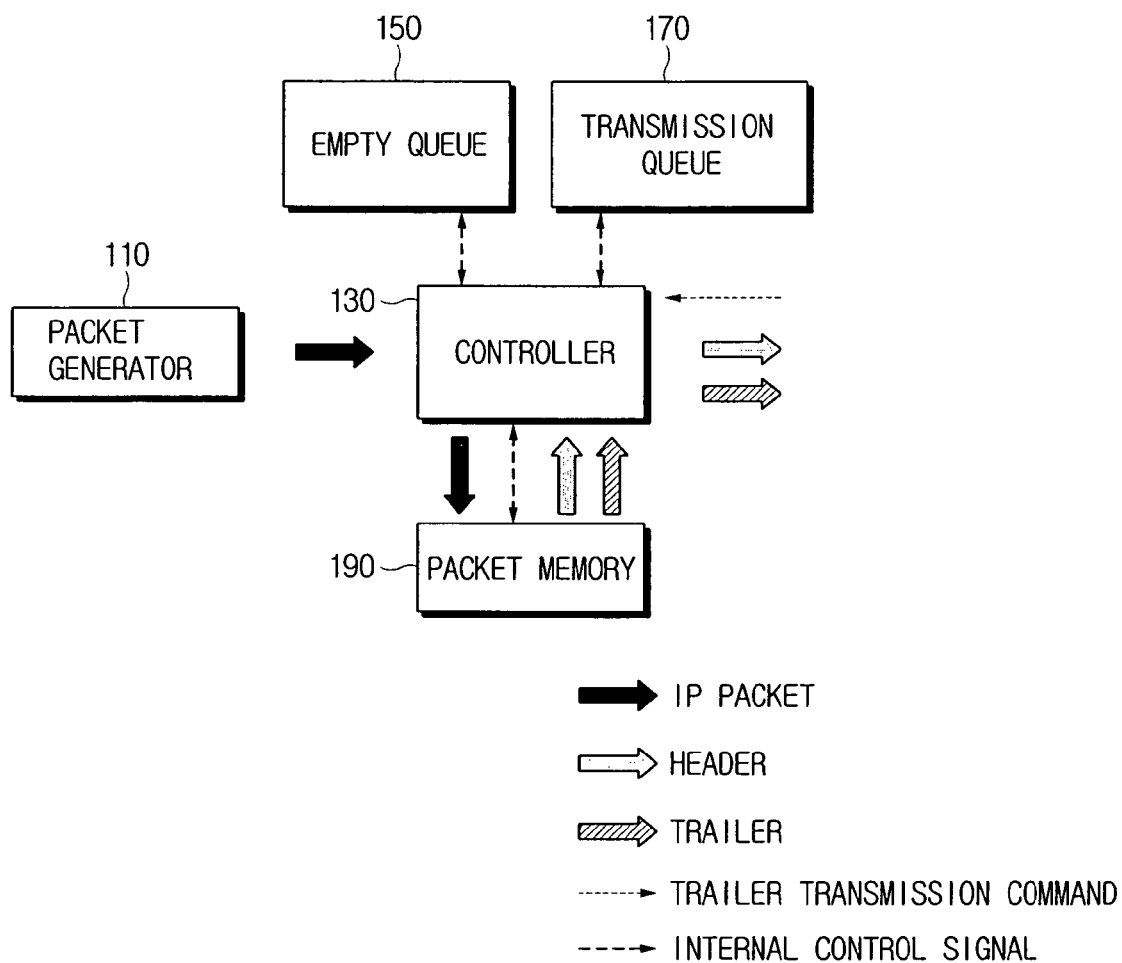
FIG. 1 is a block diagram for illustrating a conventional packet memory management system.
Figure 2:
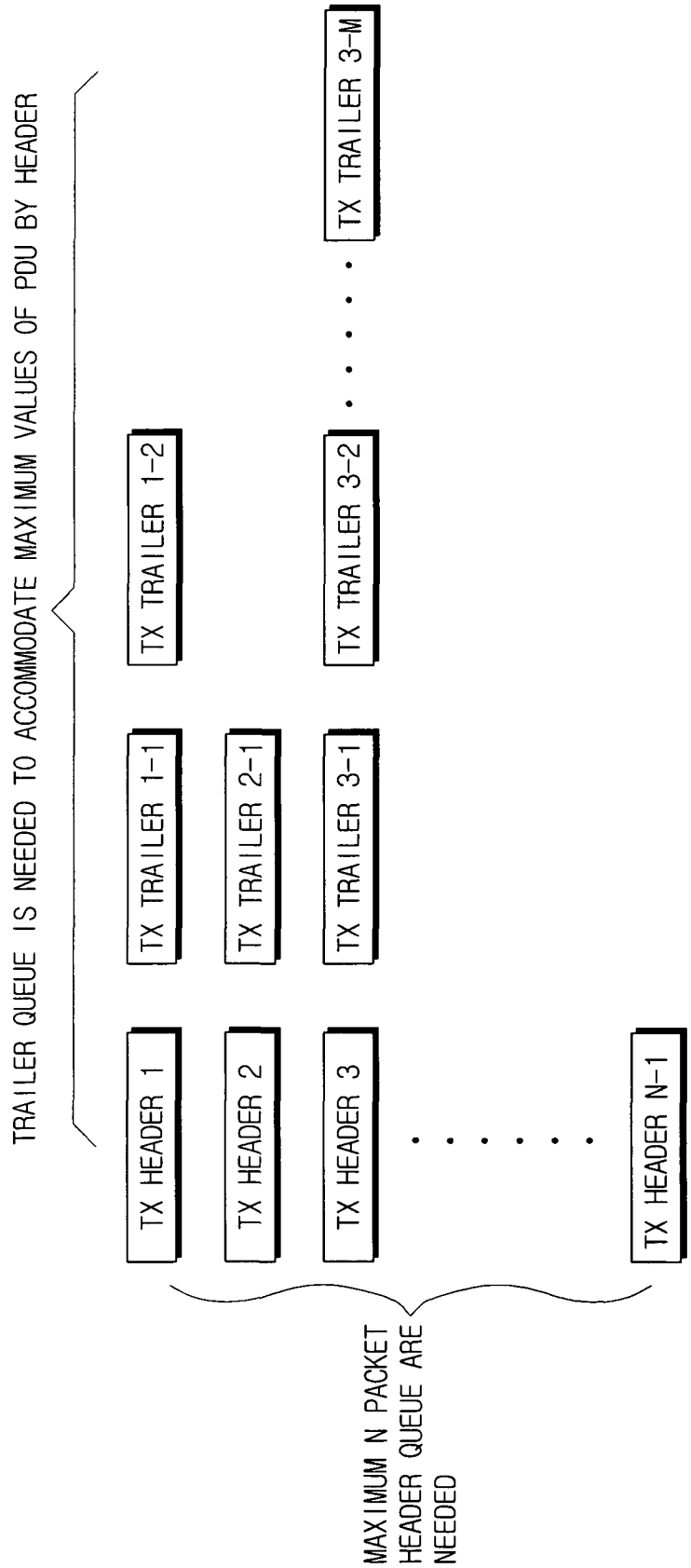
FIG. 2 is a view for conceptually illustrating a transmit queue of FIG. 1.
Figure 3:
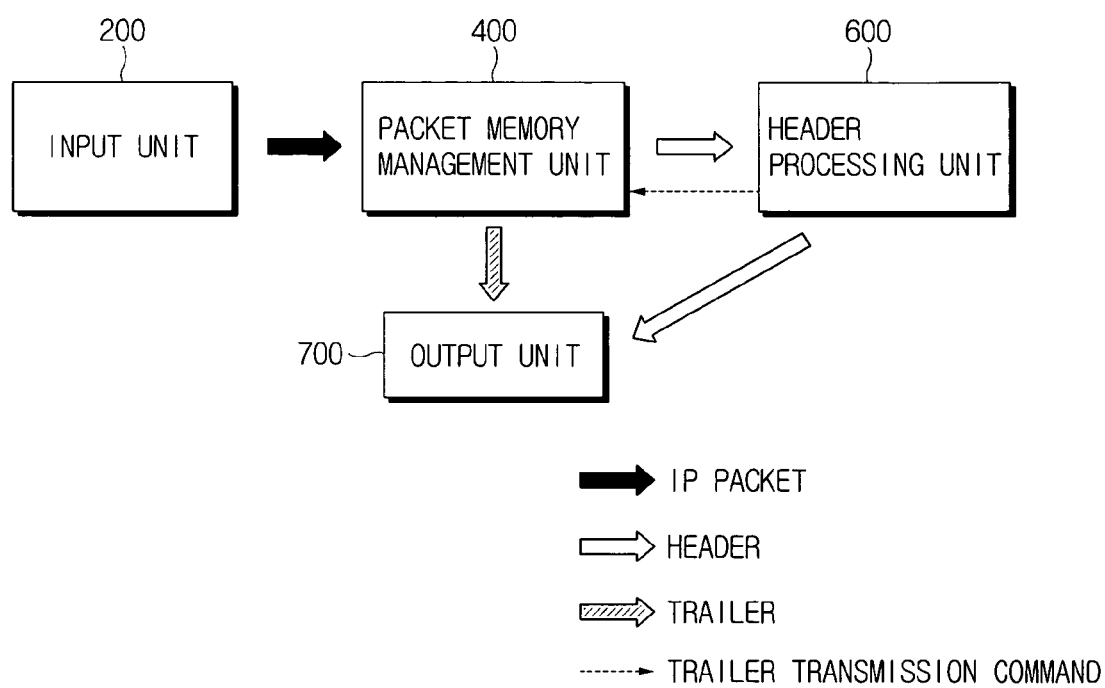
FIG. 3 is a block diagram for schematically showing a packet forwarding system according to an embodiment of the present invention.

FIG. 3 is a block diagram for schematically showing a packet forwarding system according to an embodiment of the present invention. The packet forwarding system has an input unit 200, a packet memory management unit 400, a header processing unit 600, and an output unit 700.

The input unit 200 is an interface connecting external devices and the packet forwarding system, and receives data in predetermined units of data transmission. Here, the predetermined unit of data transmission is an ATM cell, for example.

The packet memory management unit 400 de-assembles input data in units of data transmission, for example, the header of an ATM cell, generates header-removed ATM cells to create IP packets. The packet memory management unit 400 manages the created IP packets to fix a transmission order, and outputs IP packets in the fixed transmission order. The packet memory management unit 400 according to the present invention will be later described in detail.

The header processing unit 600 classifies packets and decides destinations of packets to be transmitted by using IP packet headers provided from the packet memory management unit 400. The header of an IP packet includes a destination address, an origination address, or diverse forms of services depending upon the IP packet. A transmission destination is decided by using the destination address included in the header of an IP packet.

The output unit 700 divides the IP packet header and the trailer respectively provided from the header processing unit 600 and the packet memory management unit 400 into predetermined units of data transmission, such as units of ATM cells. An ATM header is created on the respective divided ATM cells for an output to a channel.

Figure 4:
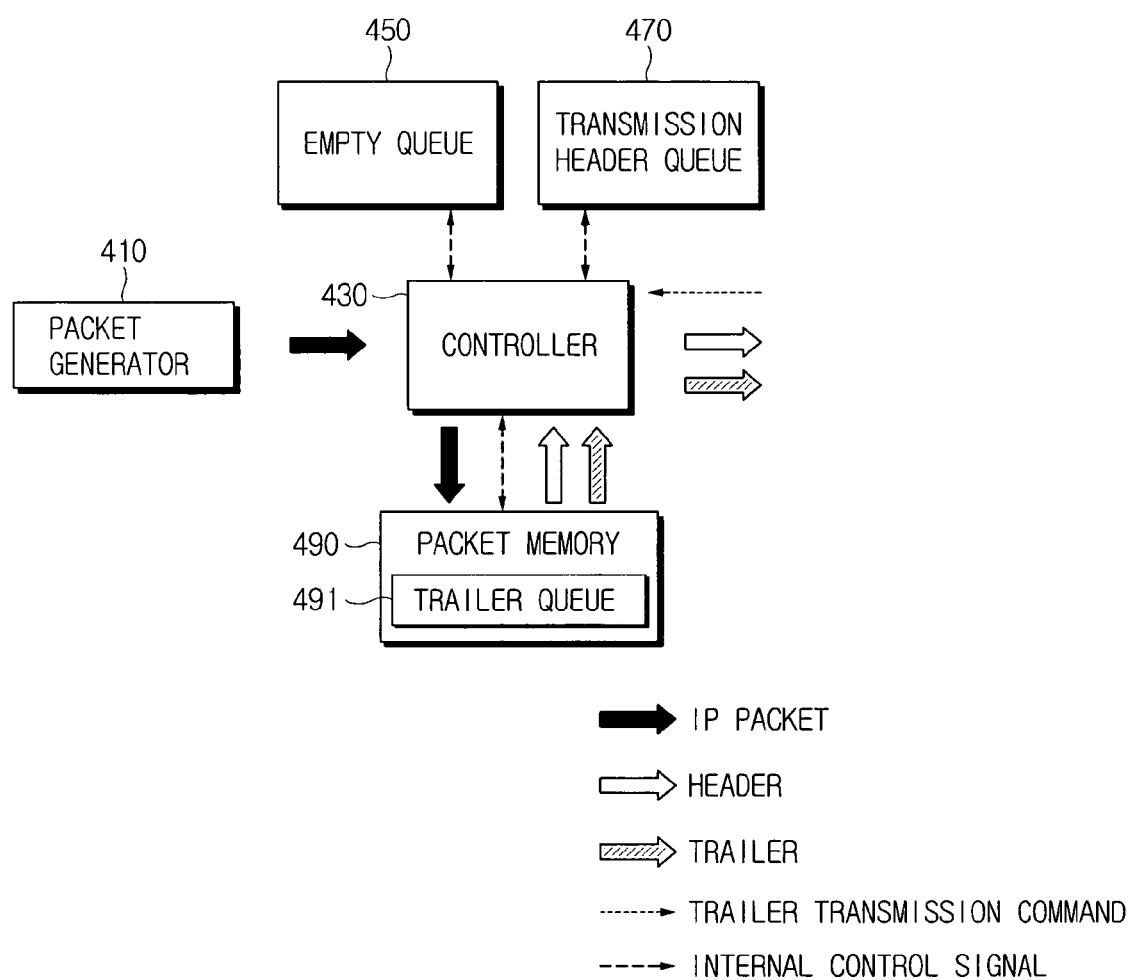
FIG. 4 is a block diagram for schematically showing a packet memory management unit of FIG. 3.

FIG. 4 is a block diagram for showing in detail a packet memory management unit 400 according to an embodiment of the present invention.

The packet memory management unit 400 has a packet generator 410, a controller 430, an empty queue 450, a transmission header queue 470, and a packet memory 490.

The packet generator 410 generates data inputted in units of data transmission such as units of ATM cells to create IP packets, and an IP packet has at least one or more subpackets each having a fixed length.

The controller 430 controls the empty queue 450 and the transmission header queue 470 to read and write subpackets to and from the packet memory 490, and transmits IP packet headers fixed by the transmission header queue 470 to the header processing unit 600 in a transmission order. Further, the controller 430 creates tags each having location information (buffer pointer) on a trailer connected with a header, and, when transmitting the header to the header processing unit 600, transmits a tag of the corresponding header together.

Figure 5:
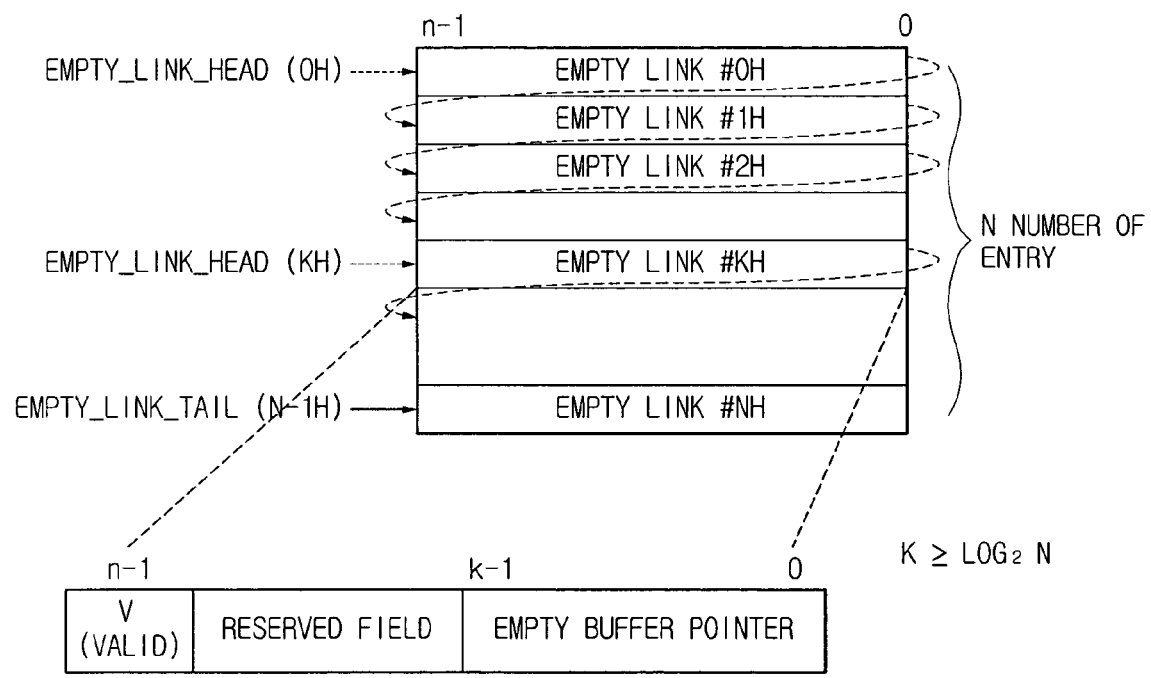
FIG. 5 is a view for explaining the structure and characteristics of an empty queue of FIG. 4.

The empty queue 450 has location information on empty spaces of the packet memory 490, that is, on empty buffers. The structure and characteristics of the empty queue 450, as shown in FIG. 5, operates in a stack basis having information on mutual connections from a head entry Empty_Link_Head (0h) up to a tail entry Empty_Link_Tail(N-1 h) of the empty queue 450.

Figure 6:
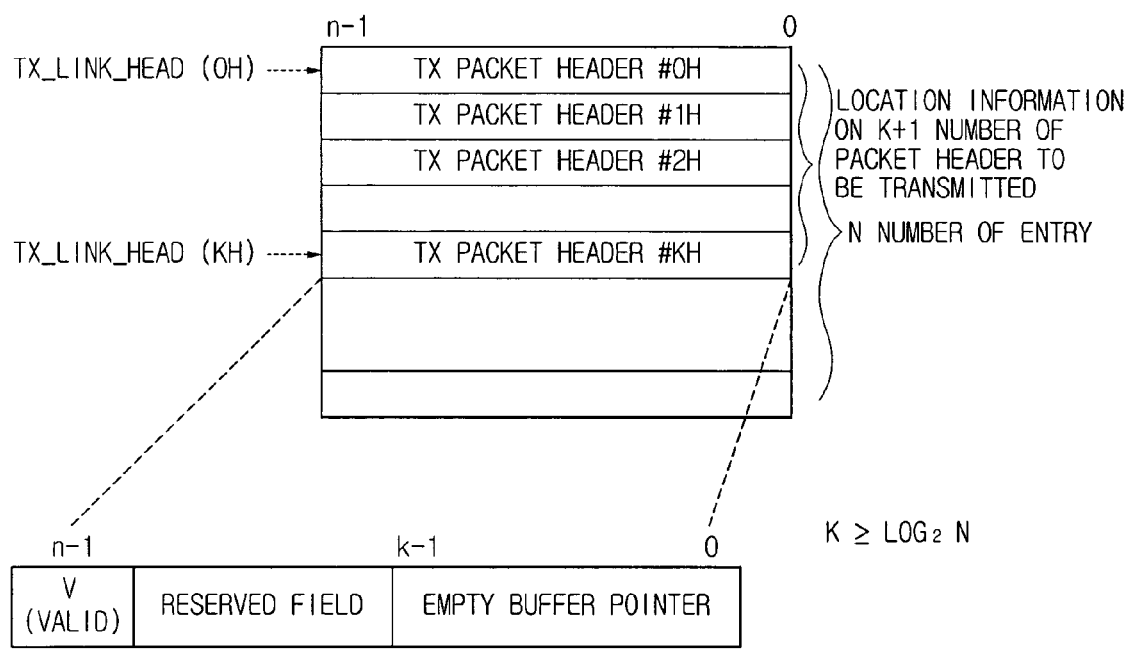
FIG. 6 is a view for explaining the structure and characteristics of a transmission header queue of FIG. 4.

The transmission header queue 470 loads location information on the header of an IP packet corresponding to an IP packet transmission order. The transmission header queue 470, as shown in FIG. 6, has the structure and characteristics that operate in the FIFO basis with respect to header information on IP packets to be transmitted. Further, a trailer queue 491 is included in the packet memory 490.

The packet memory 490 has multiple buffers, and IP packets are loaded in units of subpackets based on the location information on empty buffers provided from the empty queue 450. Further, the packet memory 490 has the trailer queue 491. The trailer queue 491 included in the packet memory 490 will be described with reference to FIG. 7a and FIG. 7b.

Figure 7A:
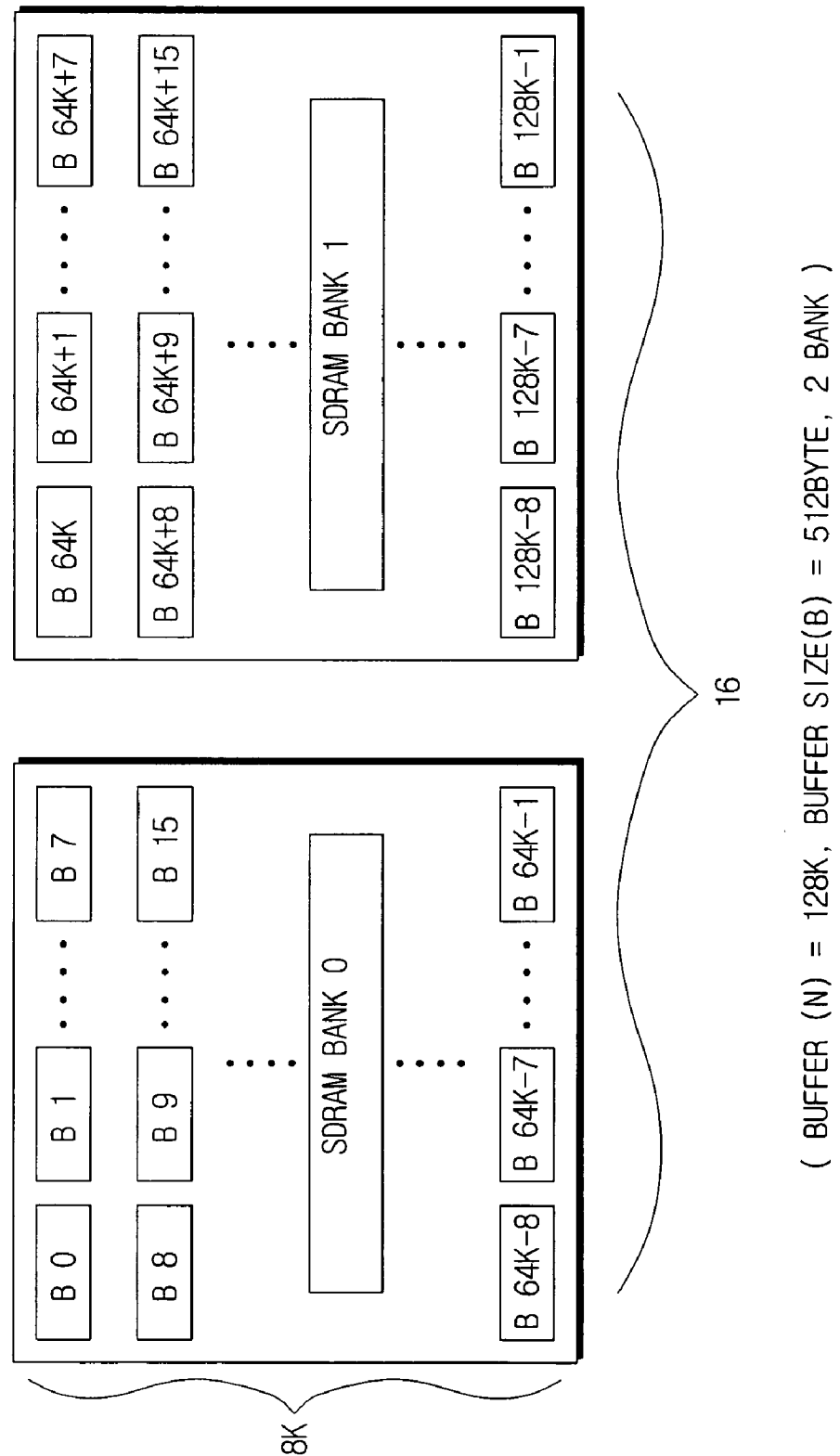
FIG. 7a is a view for showing a structure of a packet memory of FIG. 4.

FIG. 7a and FIG. 7b are views for illustrating the packet memory 490. FIG. 7a shows the packet memory 490 having N(N=128 K) buffers B each having a size of 512 bytes, and FIG. 7b shows formats of descriptors and tags included in each buffer B. The packet memory 490 shown in FIG. 7a and FIG. 7b is for a description of the trailer queue 491, and its structure and design can be carried out in various forms.

As shown in FIG. 7b, a trailer buffer pointer is included in a tag T, and a descriptor includes information N on whether a next trailer exists after a corresponding buffer. That is, if a next trailer exists after the corresponding buffer, a next buffer pointer becomes a buffer pointer at which a next trailer exists. The trailer queue 491 in the packet memory 490 operates by the above process.

Accordingly, the packet memory can be more efficiently managed by operating the trailer queue having the burst operation characteristics with use of the DRAM having the burst operation characteristics used in the packet memory 490. Further, it is cost-efficient in the economic aspect to reduce the use of expensive SRAMs used for the transmission header queue 470.

Meanwhile, the packet forwarding system having the transmission queue mode can solve a problem of performance degradation due to unnecessary consumption of time it takes to process headers as the header processing unit 600 transmits even unused trailers as well as IP packet headers. That is, the transmission header queue 470 according to the present invention transmits only IP packet headers to the header processing unit 600, and reads from the packet memory 490 and directly transmits to the output unit 700 a trailer connected to a header based on a tag transmitted together, to thereby prevent the unnecessary consumption of time it take to process the header.

Figure 8:
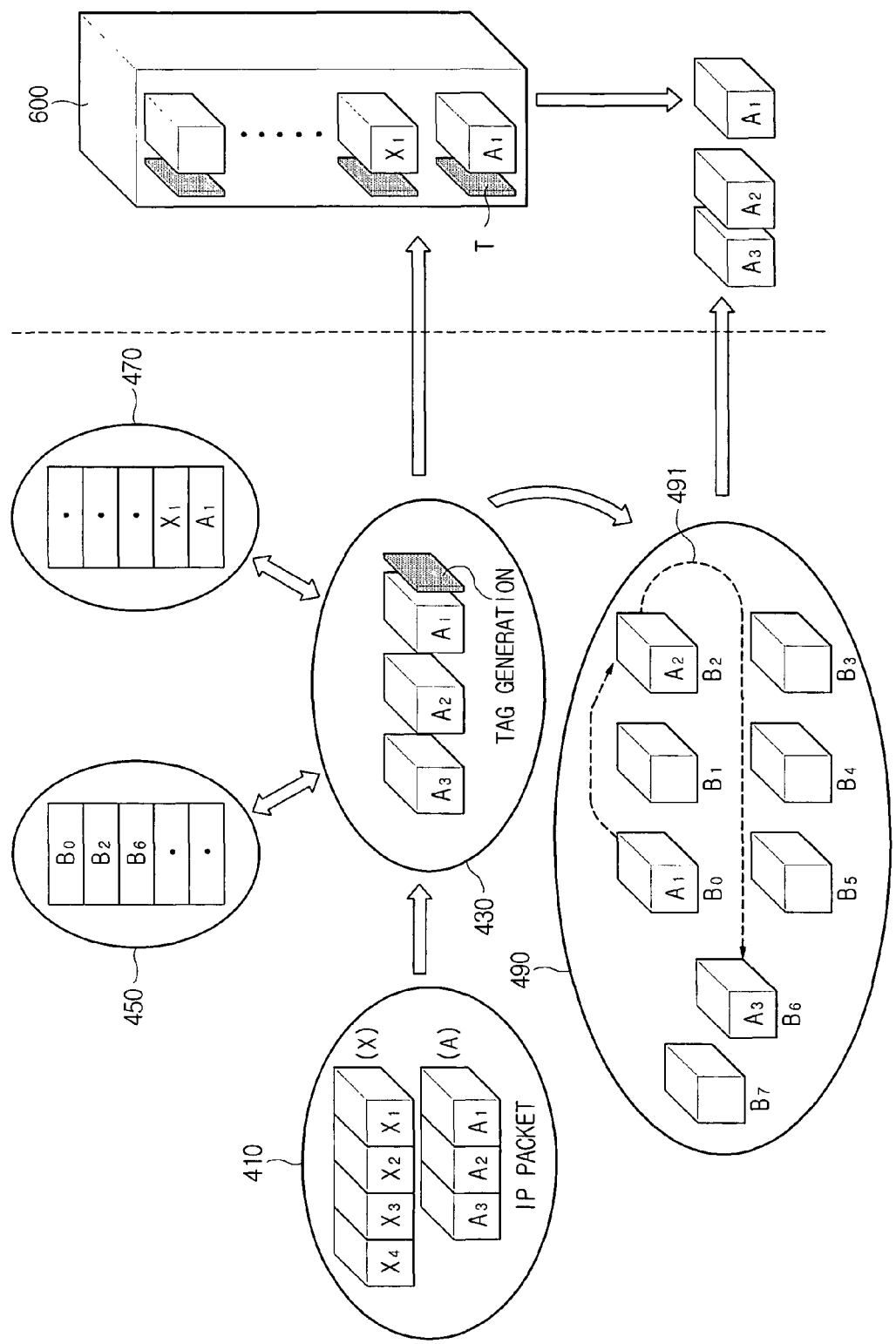
FIG. 8 is a view for conceptually explaining a packet memory management method according to an embodiment of the present invention.
Figure 9:
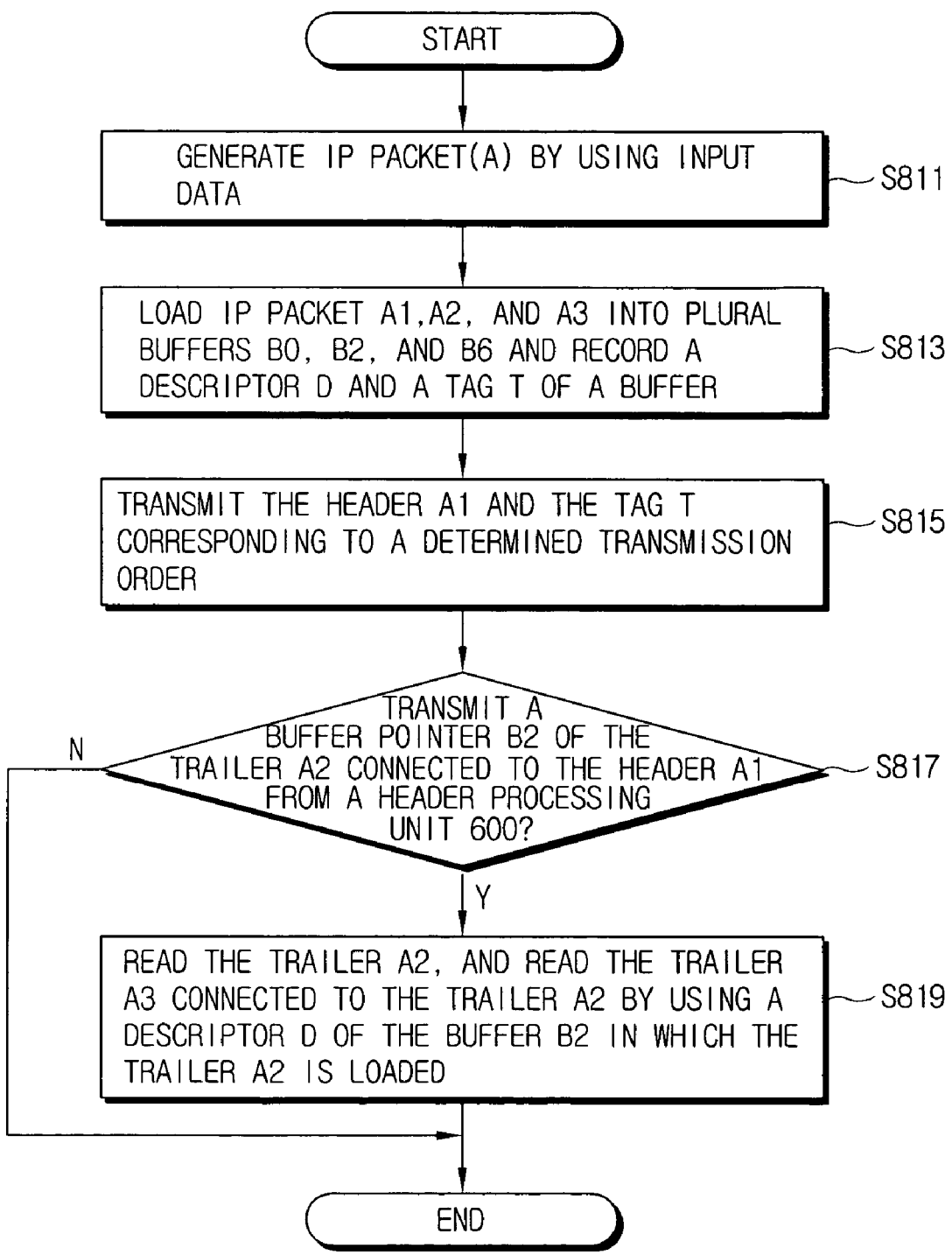
FIG. 9 is a flow chart for illustrating a packet memory management method according to an embodiment of the present invention.

Detailed descriptions will be made in detail, with reference to FIG. 8 and FIG. 9, on a method for efficiently managing the packet memory in the packet forwarding system according to the present invention.

An IP packet A generated in the packet generator 410 consists of subpackets A1, A2, and A3(S811). The controller 430 loads the subpackets A1, A2, and A3 into allocated buffers B0, B2, and B6, respectively, based on pointers of empty buffers of the buffers of the packet memory 490 provided in the empty queue 450. At this time, information on mutual connections of the subpackets A1, A2, and A3 is loaded to the descriptors and tags in the respective buffers B0, B2, and B6 (S813).

That is, in a tag of the subpacket A1 which is an IP packet header is recorded a pointer of the buffer B2 in which the subpacket A2 of connected trailer is loaded. Further, in a descriptor of the buffer B2 in which the trailer A2 is loaded is recorded information N on whether a subsequently connected trailer exists, and recorded a pointer of the buffer B6 connected to the buffer B2. As described above, the subpackets A1, A2, and A3 loaded in the packet memory 490 have information on mutual connections 491.

A pointer of the IP packet header A1 out of the subpackets A1, A2, and A3 loaded in the packet memory 490 is recorded in the transmission header queue 470.

Thereafter, by repeating the above procedures, all the header pointers having the determined transmission order are loaded in the transmission header queue 470, the controller 430 reads and transmits a corresponding header to the header processing unit 600 by using a pointer of a header entry of the transmission header queue 470 (S815). For example, in case that a head entry of the transmission header queue 470 is a pointer of the buffer B0 loaded with the header A1, the controller 430 transmits the header A1 to the header processing unit 600, and, further, transmits a tag of the buffer B0 to the header processing unit 600 together with the header A1. At the same time the header A1 is transmitted to the header processing unit 600, the controller 430 updates the empty queue 450 with the pointer of the buffer B0 loaded with the header A1.

Thereafter, the header processing unit 600 decides a packet classification and a transmission destination by using diverse information included in the header A1 of the IP packet A. If the operation of the header processing unit 600 is completed, the header processing unit 600 re-transmits to the controller 430 of the packet memory management unit 400 the pointer of the buffer B2 loaded with the trailer A2 connected with the header A1 included in the tag, and requests the trailer A2 connected to the header A1 (S817). However, if there is no trailer connected to the header, subsequent operations after the trailer request are omitted.

The controller 430 can read the trailer A2 by using the pointer of the re-transmitted buffer B2, and obtain the pointer of the buffer B6 by using N (next trailer exist) included in the descriptor of the buffer B2 and a next buffer pointer. By doing so, the controller 430 reads the trailer A3 loaded in the buffer B6 (S819). At this time, the controller 430 updates the empty queue 450 with the pointers of the buffers B2 and B6.

The trailers A2 and A3 read as above by the trailer queue included in the packet memory 490 is transmitted to the output unit 800, and the header A1 is processed in the header processing unit 600 and then transmitted to the output unit 800.

The output unit 800 divides the provided IP packet into units of data transmission for output to a channel.

Accordingly, the packet memory can be more efficiently managed by using storage media suitable for the operation characteristics of the header queue and trailer queue.

Further, a solution can be provided to performance degradation due to time it takes to process headers in the packet forwarding system requiring a high-speed packet process.

The present invention can, first, more efficiently carry out packet memory management, and, second, reduce the cost in implementing the packet memory.

Third, a solution can be provided to performance degradation due to time it takes to process headers in the packet forwarding system requiring a high-speed packet process. Accordingly, packets can be forwarded at a high speed by sending only headers of the entire IP packets to the header processing unit and by processing the headers. Therefore, improved performances can be obtained on routers, switches, gateways, and so on.

What is claimed is:

1. A packet forwarding system, comprising:
an input unit for inputting first data in units of transmission;
a packet memory management unit for assembling the input first data into an Internet Protocol (IP) packet and loading the IP packet into a packet memory, and reading out an IP packet header and a pointer of an IP packet trailer connected to the IP packet header;
a header processing unit for deciding a packet classification and a transmission destination by using the IP packet header provided from the packet memory management unit, and reporting to the packet memory management unit the pointer of the IP packet trailer to be connected to the IP packet header; and
an output unit for dividing the IP packet header and the IP packet trailer into second data in said units of transmission, receiving the IP packet header directly from the header processing unit, reading the IP packet trailer directly from the packet memory of the packet memory management unit based on the reported pointer of the IP packet trailer to be connected to the IP packet header, and outputting the second data to a channel,
wherein the packet memory management unit comprises:
the packet memory comprising plural buffers loading the IP packet, and the plural buffers storing buffer attribute information and the pointer of the IP packet trailer connected to the IP packet header; and
a controller for reading from a packet memory the IP packet header and the pointer of the IP packet trailer connected to the IP packet header, according to a transmission order determined by a transmission header queue, and transmitting the pointer of the IP packet trailer and the IP packet header to the header processing unit,
wherein the controller, if the IP packet header and the pointer of the IP packet trailer connected to the IP packet header are re-transmitted from the header processing unit, reads the IP packet trailer connected to the IP packet header from a buffer corresponding to the pointer of the IP packet trailer, and transmits the IP packet trailer to the output unit.

2. The packet forwarding system as claimed in claim 1, wherein the packet memory management unit further comprises:
a packet generator for generating the IP packet from the input first data; and
a transmission header queue for loading a pointer of the IP packet header corresponding to a transmission order of the IP packet.

3. A packet forwarding system, comprising:
an input unit for inputting first data in units of transmission;
a packet memory management unit for assembling the input first data into an Internet Protocol (IP) packet and loading the IP packet into a packet memory, and reading out an IP packet header and a pointer of an IP packet trailer connected to the IP packet header;
a header processing unit for deciding a packet classification and a transmission destination by using the IP packet header provided from the packet memory management unit, and reporting to the packet memory management unit the pointer of the IP packet trailer to be connected to the IP packet header; and
an output unit for dividing the IP packet header and the IP packet trailer into second data in said units of transmission, receiving the IP packet header directly from the header processing unit, reading the IP packet trailer directly from the packet memory of the packet memory management unit based on the reported pointer of the IP packet trailer to be connected to the IP packet header, and outputting the second data to a channel,
wherein the packet memory management unit comprises:
a packet generator for generating the IP packet from the input first data;
a transmission header queue for loading a pointer of the IP packet header corresponding to a transmission order of the IP packet; and
a controller for reading from the packet memory the IP packet header and the pointer of the IP packet trailer connected to the IP packet header, according to the transmission order determined by the transmission header queue, and transmitting the pointer of the IP packet trailer and the IP packet header to the header processing unit,
wherein the packet memory comprises plural buffers loading the IP packet, and the plural buffers storing buffer attribute information and the pointer of the IP packet trailer connected to the IP packet header; and
wherein the controller verifies whether a different IP packet trailer connected to the IP packet trailer exists by using the buffer attribute information corresponding to the pointer of the IP packet trailer, and, if the different IP packet trailer exists, reading and transmitting the different IP packet trailer to the output unit.

4. A packet forwarding system, comprising:
an input unit for inputting first data in units of transmission;
a packet memory management unit for assembling the input first data into an Internet Protocol (IP) packet and loading the IP packet into a packet memory, and reading out an IP packet header and a pointer of an IP packet trailer connected to the IP packet header;
a header processing unit for deciding a packet classification and a transmission destination by using the IP packet header provided from the packet memory management unit, and reporting to the packet memory management unit the pointer of the IP packet trailer to be connected to the IP packet header; and
an output unit for dividing the IP packet header and the IP packet trailer into second data in said units of transmission, receiving the IP packet header directly from the header processing unit, reading the IP packet trailer directly from the packet memory of the packet memory management unit based on the reported pointer of the IP packet trailer to be connected to the IP packet header, and outputting the second data to a channel,
wherein the packet memory management unit comprises:
a packet generator for generating the IP packet from the input first data
a transmission header queue for loading a pointer of the IP packet header corresponding to a transmission order of the IP packet; and
a controller for reading from the packet memory the IP packet header and the pointer of the IP packet trailer connected to the IP packet header, according to the transmission order determined by the transmission header queue, and transmitting the pointer of the IP packet trailer and the IP packet header to the header processing unit;
wherein the packet memory comprises plural buffers loading the IP packet, and the plural buffers storing buffer attribute information and the pointer of the IP packet trailer connected to the IP packet header; and
wherein the buffer attribute information includes a front pointer of a front buffer connected to a front of the buffer and a rear pointer of a rear buffer connected to a rear of the buffer, and information on whether a different IP packet trailer connected after the IP packet trailer, exists.

5. A packet forwarding method, comprising:
inputting, by an input unit, first data in units of transmission;
a packet memory management step of generating, by a packet memory management unit, the input first data into an Internet Protocol (IP) packet and loading the IP packet into a packet memory, and reading out and sending an IP packet header and a pointer of an IP packet trailer connected to the IP packet header;
a header processing step of deciding, by a header processing unit, a packet classification and a transmission destination by using the IP packet header provided from the packet memory management unit, and reporting to the packet memory management unit the pointer of the IP packet trailer to be connected to the IP packet header; and an output step for dividing, by an output unit, the IP packet header and the IP packet trailer into second data in said units of transmission, for receiving the IP packet header directly from the header processing unit, for reading the IP packet trailer directly from the packet memory of the packet memory management unit based on the reported pointer of the IP packet trailer to be connected to the IP packet header, and outputting the second data to a channel, wherein the packet memory management step comprises:

loading the IP packet into plural buffers, the plural buffers storing buffer attribute information and the pointer of the IP packet trailer connected to the IP packet header; and reading the IP packet header and the pointer of the IP packet trailer connected to the IP packet header according to a transmission order, and transmitting the pointer of the IP packet trailer and the IP packet header to the header processing unit, wherein the packet memory management step further includes a step of, if the IP packet header and the pointer of the IP packet trailer connected to the IP packet header are re-transmitted from the header processing unit, reading the IP packet trailer connected to the IP packet header from a buffer corresponding to the pointer of the IP packet trailer, and transmitting the IP packet trailer to the output unit.

6. The packet forwarding method as claimed in claim 5, wherein the packet memory management step further comprises:

assembling the input first data into the IP packet.

7. A packet forwarding method, comprising:

inputting, by an input unit, first data in units of transmission;

a packet memory management step of generating, by a packet memory management unit, the input first data into an Internet Protocol (IP) packet and loading the IP packet into a packet memory, and reading out and sending an IP packet header and a pointer of an IP packet trailer connected to the IP packet header;

a header processing step of deciding, by a header processing unit, a packet classification and a transmission destination by using the IP packet header provided from the packet memory management unit, and reporting to the packet memory management unit the pointer of the IP packet trailer to be connected to the IP packet header; and an output step for dividing, by an output unit, the IP packet header and the IP packet trailer into second data in said units of transmission, for receiving the IP packet header directly from the header processing unit, for reading the IP packet trailer directly from the packet memory of the packet memory management unit based on the reported pointer of the IP packet trailer to be connected to the IP packet header, and outputting the second data to a channel, wherein the packet memory management step includes steps of:

assembling the input first data into the IP packet;

loading the IP packet into plural buffers, the plural buffers storing buffer attribute information and the pointer of the IP packet trailer connected to the IP packet header;

reading the IP packet header and the pointer of the IP packet trailer connected to the IP packet header according to a transmission order, and transmitting the pointer of the IP packet trailer and the IP packet header to the header processing unit, and verifying whether a different IP packet trailer connected to the IP packet trailer exists by using the buffer attribute information corresponding to the pointer of the IP packet trailer, and, if the different trailer exists, reading and transmitting the different IP packet trailer to the output unit.

8. A packet forwarding method, comprising:

inputting, by an input unit, first data in units of transmission;

a packet memory management step of generating, by a packet memory management unit, the input first data into an Internet Protocol (IP) packet and loading the IP packet into a packet memory, and reading out and sending an IP packet header and a pointer of an IP packet trailer connected to the IP packet header;

a header processing step of deciding, by a header processing unit, a packet classification and a transmission destination by using the IP packet header provided from the packet memory management unit, and reporting to the packet memory management unit the pointer of the IP packet trailer to be connected to the IP packet header; and an output step for dividing, by an output unit, the IP packet header and the IP packet trailer into second data in said units of transmission, for receiving the IP packet header directly from the header processing unit, for reading the IP packet trailer directly from the packet memory of the packet memory management unit based on the reported pointer of the IP packet trailer to be connected to the IP packet header, and outputting the second data to a channel, wherein the packet memory management step includes steps of:

assembling the input first data into the IP packet;

loading the IP packet into plural buffers, the plural buffers storing buffer attribute information and the pointer of the IP packet trailer connected to the IP packet header;

reading the IP packet header and the pointer of the IP packet trailer connected to the IP packet header according to a transmission order, and transmitting the pointer of the IP packet trailer and the IP packet header to the header processing unit, and wherein the buffer attribute information includes a front pointer of a front buffer connected to a front of the buffer and a rear pointer of a rear buffer connected to a rear of the buffer, and information on whether the different IP packet trailer connected after the IP packet trailer exists.

* * * * *